US008601494B2

(12) United States Patent  
Brown et al.

(10) Patent No.: US 8,601,494 B2
(45) Date of Patent: Dec. 3, 2013

(54) MULTI-EVENT TYPE MONITORING AND SEARCHING

(75) Inventors: Lisa M. Brown, Pleasantville, NY (US); Arun Hampapur, Norwalk, CT (US); Andrew W. Senior, New York, NY (US); Chiao-Fe Shu, Scarsdale, NY (US); Yun Zhai, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 1295 days.

(21) Appl. No.: 12/013,706

(22) Filed: Jan. 14, 2008

(65) Prior Publication Data

US 2009/0183177 A1    Jul. 16, 2009

(51) Int. Cl.
  G06F 3/00      (2006.01)
  G06F 9/44      (2006.01)
  G06F 9/46      (2006.01)
  G06F 13/00     (2006.01)

(52) U.S. Cl.
  USPC .......................................... 719/318; 715/700

(58) Field of Classification Search
  None
  See application file for complete search history.

(56) References Cited

U.S. PATENT DOCUMENTS

| | | | |
|---|---|---|---|
| 3,709,121 A | 1/1973 | Simonson et al. | |
| 5,613,032 A | 3/1997 | Cruz et al. | |
| 5,689,442 A | 11/1997 | Swanson et al. | |
| 5,745,036 A | 4/1998 | Clare | |
| 5,794,207 A | 8/1998 | Walker et al. | |
| 5,956,081 A | 9/1999 | Katz et al. | |
| 6,191,613 B1 | 2/2001 | Schultz et al. | |
| 6,698,021 B1 | 2/2004 | Amini et al. | |
| 6,809,645 B1 | 10/2004 | Mason | |
| 6,847,393 B2 | 1/2005 | Ashe et al. | |
| 7,275,053 B1 | 9/2007 | Gardner et al. | |
| 7,911,346 B1 | 3/2011 | Claudatos et al. | |
| 2003/0040925 A1* | 2/2003 | Gutta et al. | 705/1 |
| 2003/0107650 A1 | 6/2003 | Colmenarez et al. | |
| 2003/0227392 A1 | 12/2003 | Ebert et al. | |
| 2003/0231769 A1 | 12/2003 | Bolle et al. | |
| 2003/0233278 A1 | 12/2003 | Marshall | |
| 2004/0111324 A1 | 6/2004 | Kim | |
| 2004/0164863 A1 | 8/2004 | Fallin et al. | |

(Continued)

FOREIGN PATENT DOCUMENTS

WO    03049057 A1    6/2003

OTHER PUBLICATIONS

Ahluwalia, U.S. Appl. No. 11/454,819, Office Action Communication, Apr. 17, 2008, 12 pages.

(Continued)

*Primary Examiner* — Andy Ho
*Assistant Examiner* — Craig Dorais
(74) *Attorney, Agent, or Firm* — Lisa Ulrich; Hoffman Warnick LLC

(57) ABSTRACT

Multiple event types are monitored for events, and surveillance data is stored for each event. Surveillance data for a primary event of one event type can be presented to a user, and surveillance data for a set of related events corresponding to another event type can be presented based on a set of relatedness criteria and the surveillance data for the primary event. A user can adjust the relatedness criteria to filter/adjust the surveillance data presented for the related event(s). A user interface can enable the user to simultaneously view the surveillance data for both events and adjust the relatedness criteria. In an illustrative application, the invention is utilized to detect fraudulent merchandise returns in a retail store.

14 Claims, 7 Drawing Sheets

(56) References Cited

U.S. PATENT DOCUMENTS

| | | |
|---|---|---|
| 2004/0249650 A1 | 12/2004 | Freedman et al. |
| 2005/0012818 A1 | 1/2005 | Kiely et al. |
| 2005/0165667 A1 | 7/2005 | Cox |
| 2005/0177859 A1 | 8/2005 | Valentino, III et al. |
| 2005/0185823 A1 | 8/2005 | Brown et al. |
| 2006/0004579 A1 | 1/2006 | Claudatos et al. |
| 2006/0089837 A1 | 4/2006 | Adar et al. |
| 2006/0227997 A1 | 10/2006 | Au et al. |
| 2007/0025593 A1 | 2/2007 | Haupt et al. |
| 2007/0294207 A1 | 12/2007 | Brown et al. |
| 2008/0252727 A1 | 10/2008 | Brown et al. |
| 2010/0002082 A1 | 1/2010 | Buehler et al. |

OTHER PUBLICATIONS

Ahluwalia, U.S. Appl. No. 11/454,819, Office Action Communication, Dec. 22, 2008, 12 pages.

Ahluwalia, U.S. Appl. No. 11/454,819, Office Action Communication, Apr. 29, 2009, 12 pages.

Ahluwalia, U.S. Appl. No. 11/454,819, Office Action Communication, Nov. 20, 2009, 12 pages.

Ahluwalia, U.S. Appl. No. 11/454,819, Office Action Communication, Jul. 8, 2010, 22 pages.

Ahluwalia, U.S. Appl. No. 11/454,819, Office Action Communication, Nov. 24, 2010, 10 pages.

Ahluwalia, U.S. Appl. No. 11/454,819, Examiner's Answer, May 10, 2011, 12 pages.

Ahluwalia, Office Action Communication for U.S. Appl. No. 12/144,057 dated May 25, 2011, 12 pages.

Ahluwalia, Office Action Communication for U.S. Appl. No. 12/144,057 dated Oct. 27, 2011, 12 pages.

Ahluwalia, Office Action Communication for U.S. Appl. No. 12/144,057 dated May 23, 2012, 13 pages.

Ahluwalia, Office Action Communication for U.S. Appl. No. 12/144,057 dated Nov. 20, 2012, 14 pages.

Ahluwalia, Office Action Communication for U.S. Appl. No. 12/144,057 dated May 6, 2013, 14 pages.

* cited by examiner

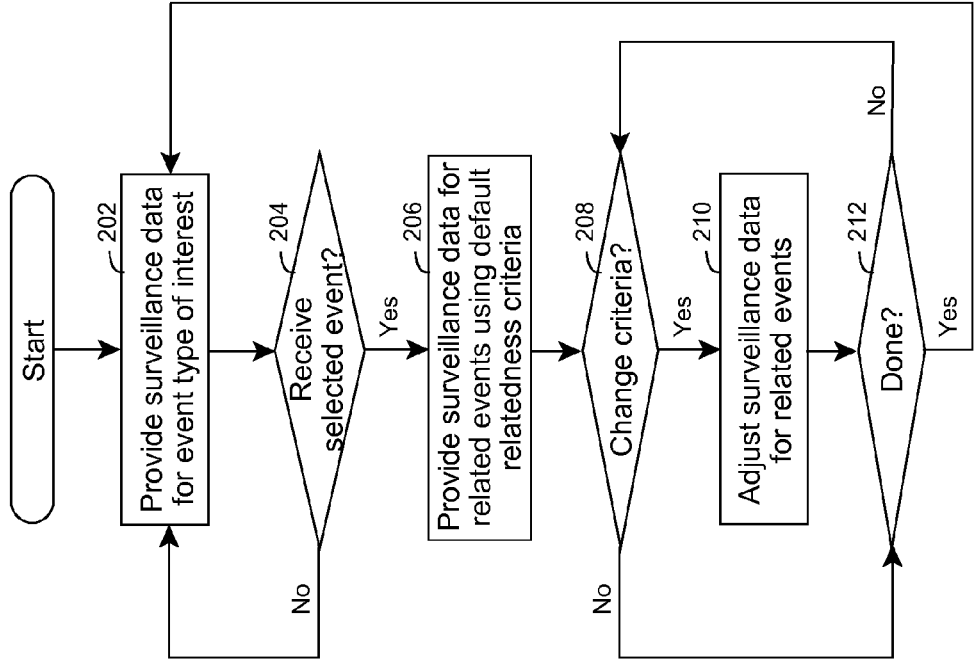
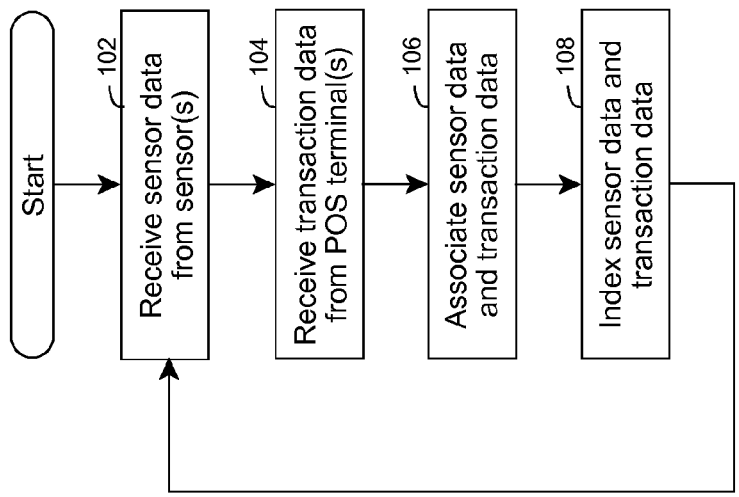

MULTI-EVENT TYPE MONITORING AND SEARCHING

CROSS REFERENCE TO RELATED APPLICATION

Aspects of the invention are related to the co-owned, co-pending U.S. patent application Ser. No. 11/454,819, which is hereby incorporated by reference.

TECHNICAL FIELD

The disclosure relates generally to sensor-based monitoring, and more particularly, to analyzing events, such as human actions and retail events.

BACKGROUND OF THE INVENTION

Fraud is a major concern in various industries. For example, in the retail industry, seeking to fraudulently obtain a refund for a purchased item is a common scheme employed by people. In the scheme, an individual makes a valid purchase of an item and leaves the retail store. Subsequently, the individual returns to the retail store with the receipt for the purchase, removes a similar item from the store shelves, and seeks to obtain a refund by presenting the receipt and the item just removed from the store. If successful, the individual will be able to keep the purchased item while obtaining a refund of the purchase price. Alternatively, without ever making a purchase, an individual may remove an item from the store shelves and attempt to receive store credit for the item at a return counter. Various other fraud schemes, such as compensation claims for fraudulent injuries, also require individual(s) to perform preparatory actions on a premises that may be monitored (e.g., public place, parking lot, etc.).

Current fraud prevention solutions are very limited. In particular, to date, retail stores typically employ individuals as store detectives and/or to monitor video surveillance in an attempt to prevent fraud. Further, video surveillance can be manually analyzed after the fraud has been committed. However, the perpetrators may not be able to be located and/or the video may no longer available upon discovery of the fraud.

Separately, transaction data is often stored for a retail store. The transaction data can include various information on the purchases made at the store (e.g., items purchased together, purchaser, payment method, cashier, cash register, date/time stamp, etc.). The transaction data can be warehoused and exploited for department and/or associate performance analysis, stock control, and information about the shopping behaviors of customers. Additionally, the transaction data can be used in a fraud investigation, but the transaction data is not fully exploited. Integration of surveillance video with transaction data is typically limited to copying timestamps from one system to the other, which may not be synchronized between the systems.

SUMMARY OF THE INVENTION

Aspects of the invention provide a solution in which multiple event types are monitored for events, and surveillance data is stored for each event. Surveillance data for a primary event of one event type can be presented to a user, and surveillance data for a set of related events corresponding to another event type can be presented based on a set of relatedness criteria and the surveillance data for the primary event. A user can adjust the relatedness criteria to filter/adjust the surveillance data presented for the related event(s). A user interface can enable the user to simultaneously view the surveillance data for both events and adjust the relatedness criteria. In an illustrative application, the invention is utilized to detect fraudulent merchandise returns in a retail store.

A first aspect of the invention provides a method of presenting surveillance data for an area, the method comprising: providing primary surveillance data for a set of primary events corresponding to one of a plurality of monitored event types for presentation to a user; obtaining a selected event from the set of primary events and a corresponding set of relatedness criteria; identifying a set of related events corresponding to another one of the plurality of monitored event types based on the surveillance data for the selected event and the set of relatedness criteria; and providing related surveillance data for each related event for presentation to the user.

A second aspect of the invention provides a system for presenting surveillance data for an area, the system comprising: a component for providing primary surveillance data for a set of primary events corresponding to one of a plurality of monitored event types for presentation to a user; a component for obtaining a selected event from the set of primary events and a corresponding set of relatedness criteria; a component for identifying a set of related events corresponding to another one of the plurality of monitored event types based on the surveillance data for the selected event and the set of relatedness criteria; and a component for providing related surveillance data for each related event for presentation to the user.

A third aspect of the invention provides a computer program comprising program code stored on a computer-readable medium, which when executed, enables a computer system to implement a method of presenting surveillance data for an area, the method comprising: providing primary surveillance data for a set of primary events corresponding to one of a plurality of monitored event types for presentation to a user; obtaining a selected event from the set of primary events and a corresponding set of relatedness criteria; identifying a set of related events corresponding to another one of the plurality of monitored event types based on the surveillance data for the selected event and the set of relatedness criteria; and providing related surveillance data for each related event for presentation to the user.

A fourth aspect of the invention provides a method of generating a system for presenting surveillance data for an area, the method comprising: providing a computer system operable to: provide primary surveillance data for a set of primary events corresponding to one of a plurality of monitored event types for presentation to a user; obtain a selected event from the set of primary events and a corresponding set of relatedness criteria; identify a set of related events corresponding to another one of the plurality of monitored event types based on the surveillance data for the selected event and the set of relatedness criteria; and provide related surveillance data for each related event for presentation to the user.

A fifth aspect of the invention provides a user interface including: a first panel for providing primary surveillance data for a set of primary events corresponding to one of a plurality of monitored event types; and a set of user interface controls for enabling a user to identify a selected event from the set of primary events and define a set of relatedness criteria; and a second panel for providing related surveillance data for a set of related events corresponding to another one of the plurality of monitored event types based on the surveillance data for the selected event and the set of relatedness criteria.

Other aspects of the invention provide methods, systems, program products, and methods of using and generating each, which include and/or implement some or all of the actions described herein. The illustrative aspects of the invention are designed to solve one or more of the problems herein described and/or one or more other problems not discussed.

BRIEF DESCRIPTION OF THE DRAWINGS

These and other features of the disclosure will be more readily understood from the following detailed description of the various aspects of the invention taken in conjunction with the accompanying drawings that depict various aspects of the invention.

FIGS. 2A-B show illustrative processes that can be implemented by the environment of FIG. 1 according to embodiments.

It is noted that the drawings are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As indicated above, aspects of the invention provide a solution in which multiple event types are monitored for events, and surveillance data is stored for each event. Surveillance data for a primary event of one event type can be presented to a user, and surveillance data for a set of related events corresponding to another event type can be presented based on a set of relatedness criteria and the surveillance data for the primary event. A user can adjust the relatedness criteria to filter/adjust the surveillance data presented for the related event(s). A user interface can enable the user to simultaneously view the surveillance data for both events and adjust the relatedness criteria. In an illustrative application, the invention is utilized to detect fraudulent merchandise returns in a retail store. As used herein, unless otherwise noted, the term "set" means one or more (i.e., at least one) and the phrase "any solution" means any now known or later developed solution.

Figure 1:
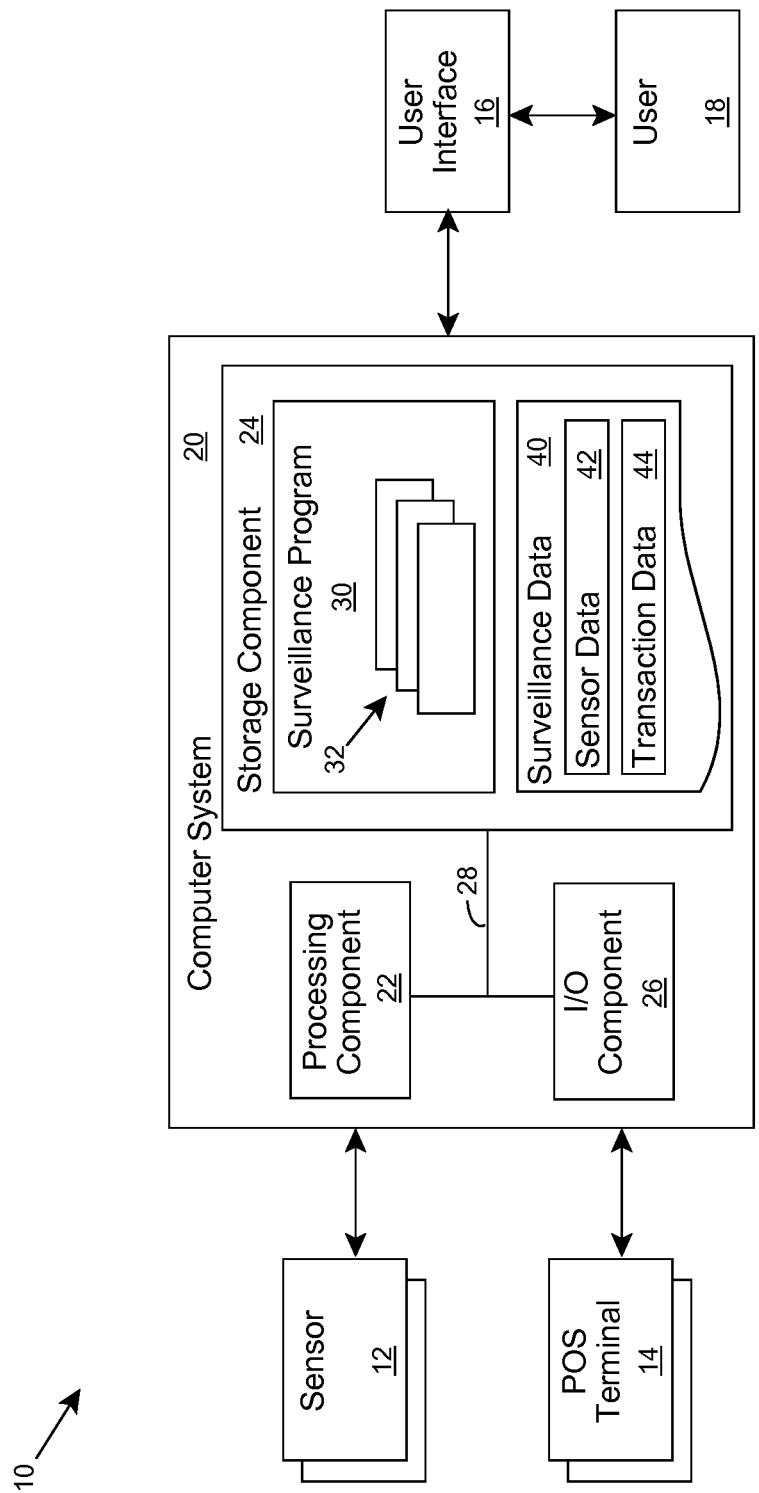
FIG. 1 shows an illustrative environment for presenting surveillance data for an area according to an embodiment.

Turning to the drawings, FIG. 1 shows an illustrative environment 10 for presenting surveillance data for an area according to an embodiment. To this extent, environment 10 includes a computer system 20 that can perform a process described herein in order to monitor the area. In particular, computer system 20 is shown including a surveillance program 30, which makes computer system 20 operable to monitor the area by performing a process described herein.

Computer system 20 is shown including a processing component 22 (e.g., one or more processors), a storage component 24 (e.g., a storage hierarchy), an input/output (I/O) component 26 (e.g., one or more I/O interfaces and/or devices), and a communications pathway 28. In general, processing component 22 executes program code, such as surveillance program 30, which is at least partially stored in storage component 24. While executing program code, processing component 22 can read and/or write data to/from storage component 24 and/or I/O component 26. Pathway 28 provides a communications link between each of the components in computer system 20. I/O component 26 can comprise one or more human I/O devices, which enable a human user 18 to interact with computer system 20 and/or one or more communications devices to enable a system user 18 to communicate with computer system 20 using any type of communications link.

In any event, computer system 20 can comprise one or more general purpose computing articles of manufacture (e.g., computing devices) capable of executing program code installed thereon. As used herein, it is understood that "program code" means any collection of instructions, in any language, code or notation, that cause a computing device having an information processing capability to perform a particular function either directly or after any combination of the following: (a) conversion to another language, code or notation; (b) reproduction in a different material form; and/or (c) decompression. To this extent, surveillance program 30 can be embodied as any combination of system software and/or application software. Further, surveillance program 30 can be implemented using a set of modules 32. In this case, a module 32, when embodied in a tangible medium of expression, can comprise a component that enables computer system 20 to perform a set of actions used by surveillance program 30, and can be separately developed and/or implemented from other portions of development program 30. To this extent, surveillance program 30 can comprise multiple program products, which can be separately developed and/or implemented, and integrated to enable the functionality described herein. Further, it is understood that some of the functionality discussed herein may not be implemented or additional functionality may be included as part of computer system 20.

When computer system 20 comprises multiple computing devices, each computing device can have only a portion of surveillance program 30 installed thereon (e.g., one or more modules 32). However, it is understood that computer system 20 and surveillance program 30 are only representative of various possible equivalent systems that may perform a process described herein. To this extent, in other embodiments, the functionality provided by computer system 20 and surveillance program 30 can be at least partially implemented by one or more components that include any combination of general and/or specific purpose hardware with or without program code. In each embodiment, the hardware and program code, if included, can be created using standard engineering and programming techniques, respectively.

Regardless, when computer system 20 includes multiple computing devices, the computing devices can communicate over any type of communications link. Further, while performing a process described herein, computer system 20 can communicate with one or more other computer systems using any type of communications link. In either case, the communications link can comprise any combination of various types of wired and/or wireless links; comprise any combination of one or more types of networks; and/or utilize any combination of various types of transmission techniques and protocols.

As discussed herein, surveillance program 30 enables computer system 20 to monitor an area. In an illustrative implementation that is described herein, the area is an interior of a retail store. In this case, a set of sensors 12 can include image sources (e.g., video, still frame, or the like), audio sensors, motion sensors, etc. Further, the retail store can include a set of point of sale (POS) terminals 14, one of which can be designated for merchandise returns and other customer service-related events.

Various aspects of the retail store implementation are shown and described primarily with respect to surveillance data 40 that includes sensor data 42 (e.g., image data) and transaction data 44. Regardless, in an embodiment, a retail store includes multiple image sources (sensors 12) that acquire a series of images (still frames and/or video) for different areas within the retail store, which are stored as sensor data 42. For example, the retail store can include at least one image source for each entrance and at least one image source for each POS terminal 14, including at least one image source for the POS terminal 14 designated for returns/customer service.

FIG. 2A shows an illustrative operation of environment 10 according to an embodiment. Referring to FIGS. 1 and 2A, during operation, sensor(s) 12 and POS terminal(s) 14 generate sensor data 42 and transaction data 44, respectively. In process 102, computer system 20 receives sensor data 42 from sensor(s) 12, and in process 104, computer system 20 receives transaction data 44 from POS terminal(s) 14. In process 106, computer system 20 analyzes sensor data 42 and transaction data 44 and associates sensor data 42 and transaction data 44 that are related. For example, computer system 20 can receive transaction data 44 for a POS event (e.g., sale, return, or the like) that occurs at a POS terminal 14. Computer system 20 can store transaction data 44 on the POS event (e.g., amount, date/time, cashier, location, receipt available?, etc.) and store it as surveillance data 40. Further, computer system 20 can associate the corresponding sensor data 42 obtained from the sensor(s) 12 that capture sensor data 42 for the corresponding POS terminal 14.

Still further, computer system 20 can associate sensor data 42 that corresponds to other actions of the customer while in the retail store, including, for example, entry into the store, location in an aisle, etc. For example, multiple observations of a person can be obtained from an initial observation of the person (e.g., when entering a store or when making a purchase/return) as described in the co-owned, co-pending U.S. patent application Ser. No. 11/454,819, which was previously incorporated by reference. In this case, each observation can be associated with the POS event.

Computer system 20 can collectively store all of the sensor data 42 and related transaction data 44 as a record for the POS event in surveillance data 40 using any solution. To this extent, in process 108, computer system 20 can index the data for the POS event using several searchable criteria, including for example, date/time of sale, cashier, register, dollar amount, purchased item(s), and/or the like. Further, additional data, such as an amount of time between entry and the POS event, feature(s) of the customer, location(s) of the customer in the retail store, and/or the like, can be stored and made searchable, when available. Regardless, in order to help ensure accurate data for the POS event, computer system 20 can periodically synchronize the dates/times of each sensor 12 and POS terminal 14 using any solution.

As shown in FIG. 1, computer system 20 can manage a user interface 16, which enables a user 18 to view and analyze surveillance data 40. Illustrative user interfaces are shown and described for monitoring merchandise returns at a retail store in which image data captured by an image sensor 12 for the POS terminal 14 is associated with transaction data 44 for the merchandise return. However, it is understood that this application, and the user interfaces shown herein, are only illustrative of numerous types of applications and user interfaces that can be implemented under aspects of the invention.

Figure 3:
FIG. 3 shows an illustrative user interface for displaying merchandise return events according to an embodiment.

FIG. 3 shows an illustrative user interface 50 for displaying merchandise return events, which can be generated by computer system 20 and provided for presentation to user 18, according to an embodiment. In general, user interface 50 can present a scrollable (when necessary) listing of all return events for a designated time period for a retail store. As shown, various data for each return event, such as a date/time, transaction number, transaction type, object(s) returned, value(s), register number, associate (cashier), supervisor, reason, and/or the like, can be displayed in user interface 50. It is understood that various additional/alternative data, such as tender and/or refund method, original purchase transaction data (when receipt is available), and/or the like, can be displayed in user interface 50.

User interface 50 includes a search area that enables user 18 to selectively limit the types of POS event records that are displayed in user interface 50. For example, user 18 can use user interface 50 to designate a particular time frame (e.g., date and/or hours), limit the data to a particular POS terminal 14 (register), specify other search criteria (e.g., price range, SKU, associate, item name), and/or the like. In addition, each of the records, values for a field in the records, and field headings in user interface 50 can enable user 18 to adjust the data, obtain a different view of the data (re-sorted or filtered), and/or the like, based on any number of criteria. For example, by clicking on a field heading (e.g., value) the records can be sorted according to their corresponding values for the field. Similarly, by clicking on a particular value of a record for a field (e.g., associate ID/name), the records can be limited to only those records that have the same value. Illustrative criteria include selecting POS events by: type, e.g., to evaluate only returns versus the other types of POS events; register number, e.g., to extract only customer service register(s); associate name/ID, e.g., to evaluate the actions of a particular associate suspected of "sweet hearting" or assisting a customer in carrying out fraud or to isolate a POS event reported by the associate; value, e.g., to limit analysis to certain high value (and therefore potentially high loss) POS events; item name/SKU; time of occurrence; and/or the like. In this manner, user interface 50 provides a rich interface to browse and search the various POS events.

Figure 4:
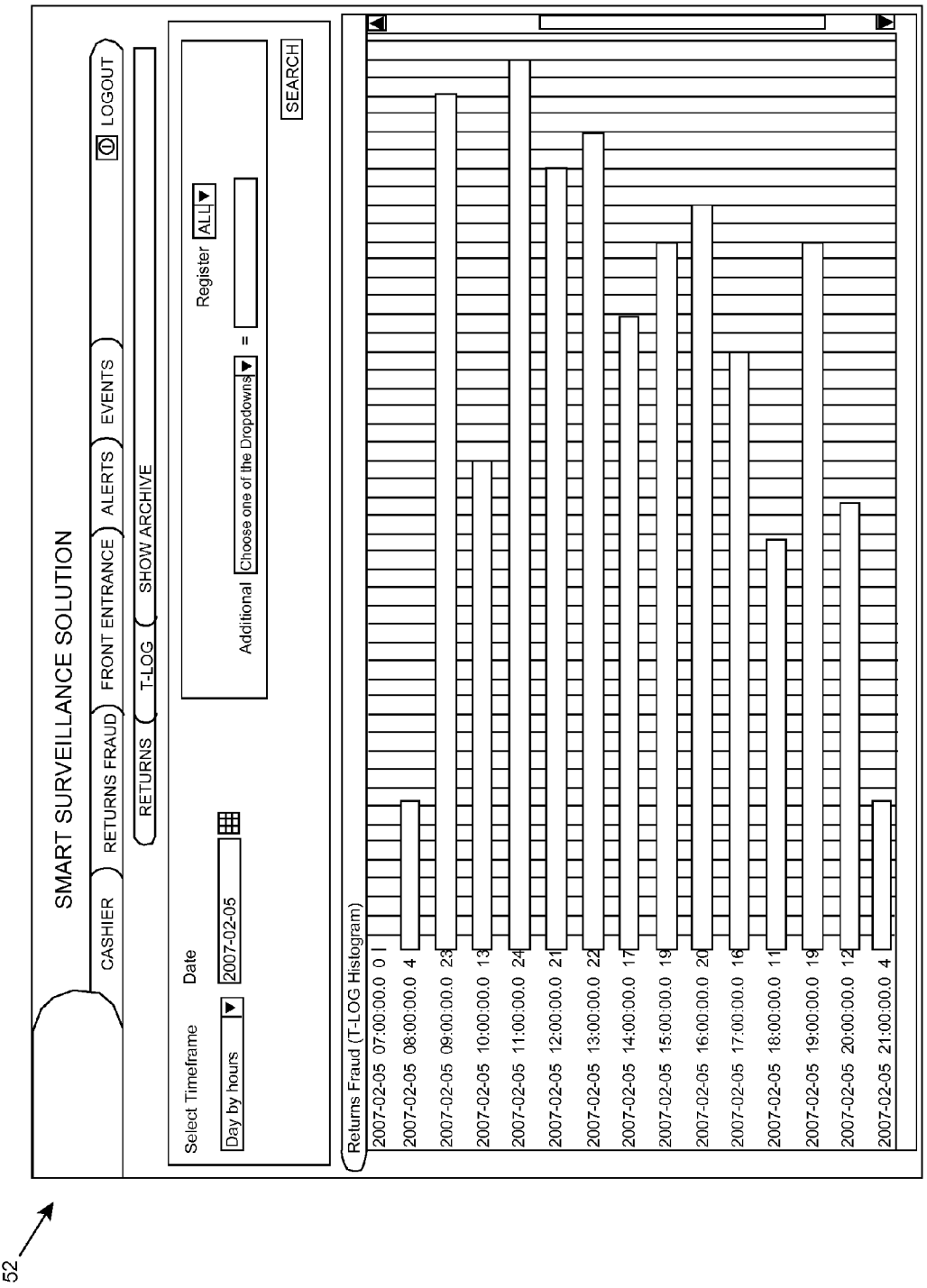
FIG. 4 shows an illustrative user interface for displaying statistical data for merchandise return events according to an embodiment.

Additionally, user interface 50 can enable user 18 to alternate between various display formats for the POS event records. For example, FIG. 4 shows an illustrative user interface 52 for displaying statistical data for merchandise return events, which can be generated by computer system 20 and provided for presentation to user 18, according to an embodiment. In this case, user interface 52 displays the statistical data in the form of a histogram, in which a number of returns for a given day are grouped by hour. It is understood that use of a histogram is only illustrative, and any grouping and/or statistical presentation method can be utilized. As with user interface 50 (FIG. 3), user interface 52 can enable user 18 to designate various search/filter criteria, which can be applied to generate the histogram.

Further, the histogram can enable user 18 to drill down into the underlying data. For example, clicking on a bar may generate statistical data for a narrower time frame. To this extent, in response to clicking on a bar that represents a day's transactions, computer system 20 may generate a user interface 52 that includes a histogram of that day's transactions broken down by hour. Alternatively, by clicking on a particular bar in the histogram, e.g., when the bar represents a minimal time frame (e.g., one hour) or a minimal number of transactions (e.g., less than 100), computer system 20 can generate user interface 50 to display the records for the events that correspond to the bar in the histogram.

Returning to FIG. 3, user interface 50 also includes columns 54A-C for each POS event record that enable user 18 to request to view image data corresponding to the POS event, if available. For example, in response to user 18 clicking on an icon in column 54A for a POS event record, computer system 20 can present image data (one or more still images and/or a video) for the POS terminal 14 where and when the POS event occurred. In response to user 18 clicking on an icon in column 54B for a POS event record, computer system 20 can present image data for the customer at the retail store (e.g., at the POS terminal 14, entrance, aisle(s), and/or the like), if available. Additionally, in response to user 18 clicking on an icon in column 54C for a POS event record, computer system 20 can generate a new interface that enables user 18 to view and analyze image data acquired around the time of the POS event.

Figure 5A:
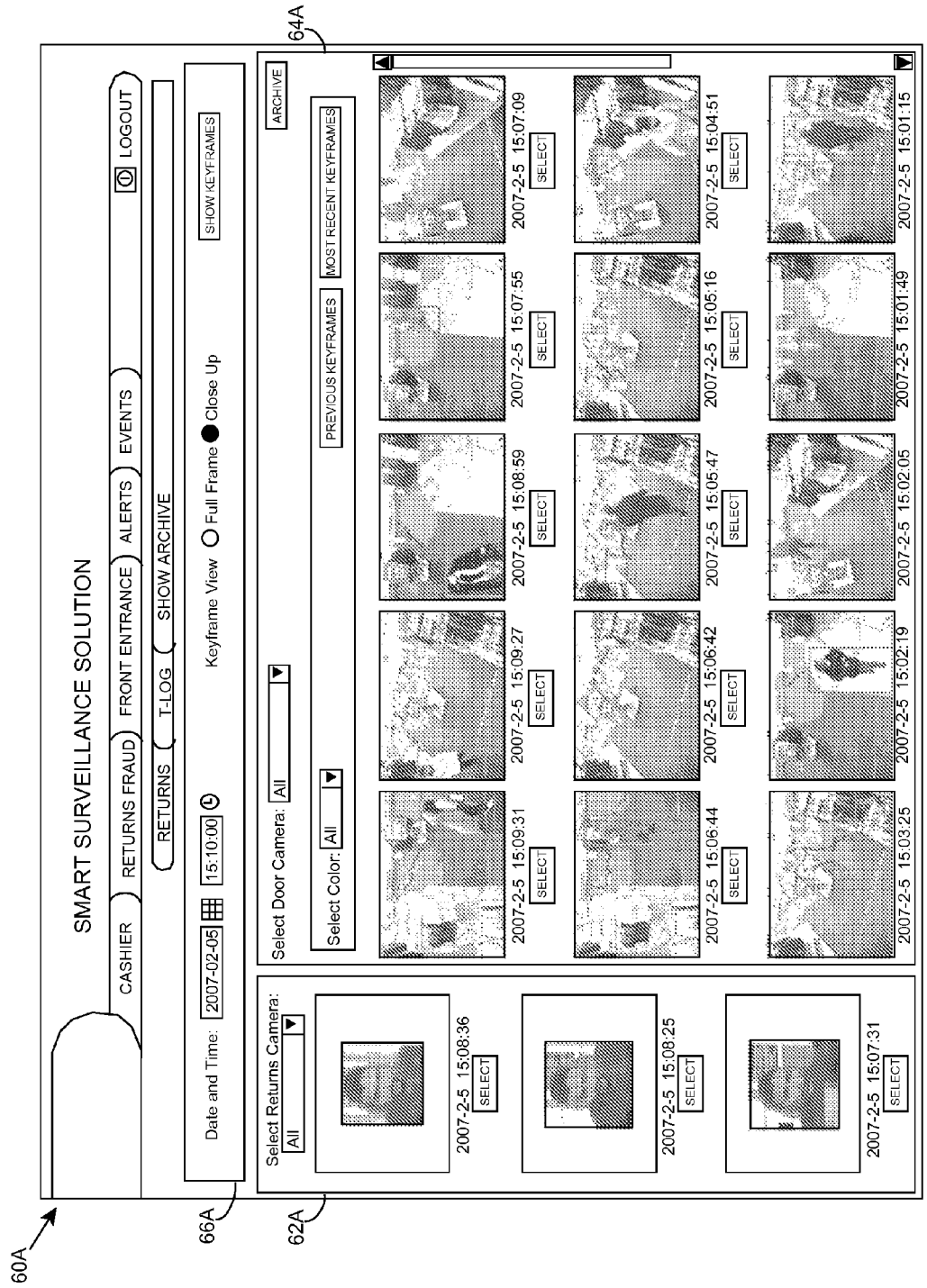
FIGS. 5A-B show illustrative user interfaces for conducting people searches according to an embodiment.

To this extent, FIG. 5A shows an illustrative user interface 60A for conducting people searches, which can be generated by computer system 20 and provided for presentation to user 18, according to an embodiment. User interface 60A includes a first panel 62A for displaying surveillance data 40 for a first set of monitored events, in this case, customer returns, and a second panel 64A for displaying surveillance data 40 for another set of monitored events, in this case, customer entrances into a retail store. However, it is understood that customer returns and customer entrances are only illustrative events, and user interface 60A can be used to display surveillance data 40 for events of any combination of two or more distinct monitored event types. Regardless, user interface 60A includes a third panel 66A, which includes various user interface controls for enabling user 18 to designate settings that apply surveillance data 40 to be displayed in both panels 62A, 64A. Additionally, each panel 62A, 64A includes user interface control(s) that enable user 18 to designate settings that are applicable only to surveillance data 40 displayed in the corresponding panel 62A, 64A. Additional user interface features can be included in user interface 60A. For example, by moving a mouse over an image, can display an alternative frame (e.g., zoom in is displayed by default, and the full frame is displayed when the cursor pauses over the image), additional surveillance data 40 (e.g., a duration of an event, such as how long a face was visible), and/or the like.

When computer system 20 generates user interface 60A in response to user 18 clicking on an icon in column 54C (FIG. 3), user 18 may be seeking to determine if the POS event, in this case a merchandise return, was fraudulent. As a result, panel 62A can display image data that was captured for the POS terminal 14 at which the POS event occurred, at a time of the POS event and a time frame prior to the POS event. In this manner, panel 62A can display a series of images that correspond to the POS event. Computer system 20 can determine what image(s) to display in panel 62A using any solution. For example, computer system 20 can display a last image captured prior to the POS event, and images captured every N seconds prior to the last image. Alternatively, computer system 20 can perform image processing to select a set of images for display in panel 62A that provide the best data (e.g., clearest image of the customer's face).

One approach to acquiring additional information regarding an event, is to analyze other events that may be related to the event. For example, when monitoring a retail store, computer system 20 can monitor other event types in addition to POS events, such as, customer entries/exits to/from the store, customer presence in an aisle, removal of an item from a shelf, an item breaking, and/or the like. To this extent, a user that is seeking to analyze whether a merchandise return was fraudulent, could analyze customer entries into the store (to ensure that the customer entered the store with the merchandise), customer presence in an aisle (e.g., to determine whether the customer went to the aisle where the item is sold), item removal from a shelf (e.g., to determine if the customer removed the item from the shelf and presented it for store credit), and/or the like. For example, computer system 20 can display surveillance data for customer entry events into the retail store in panel 64A.

Additionally, computer system 20 can limit the analysis of the other events to a subset of these other monitored events based on a set of relatedness criteria. For example, when analyzing a merchandise return, only those customer entries that preceded the return can be analyzed. Similarly, computer system 20 can use other relatedness criteria, such as facial recognition, clothing color, time between two events, and/or the like, to limit the related event(s) that are presented for analysis.

Figure 6:
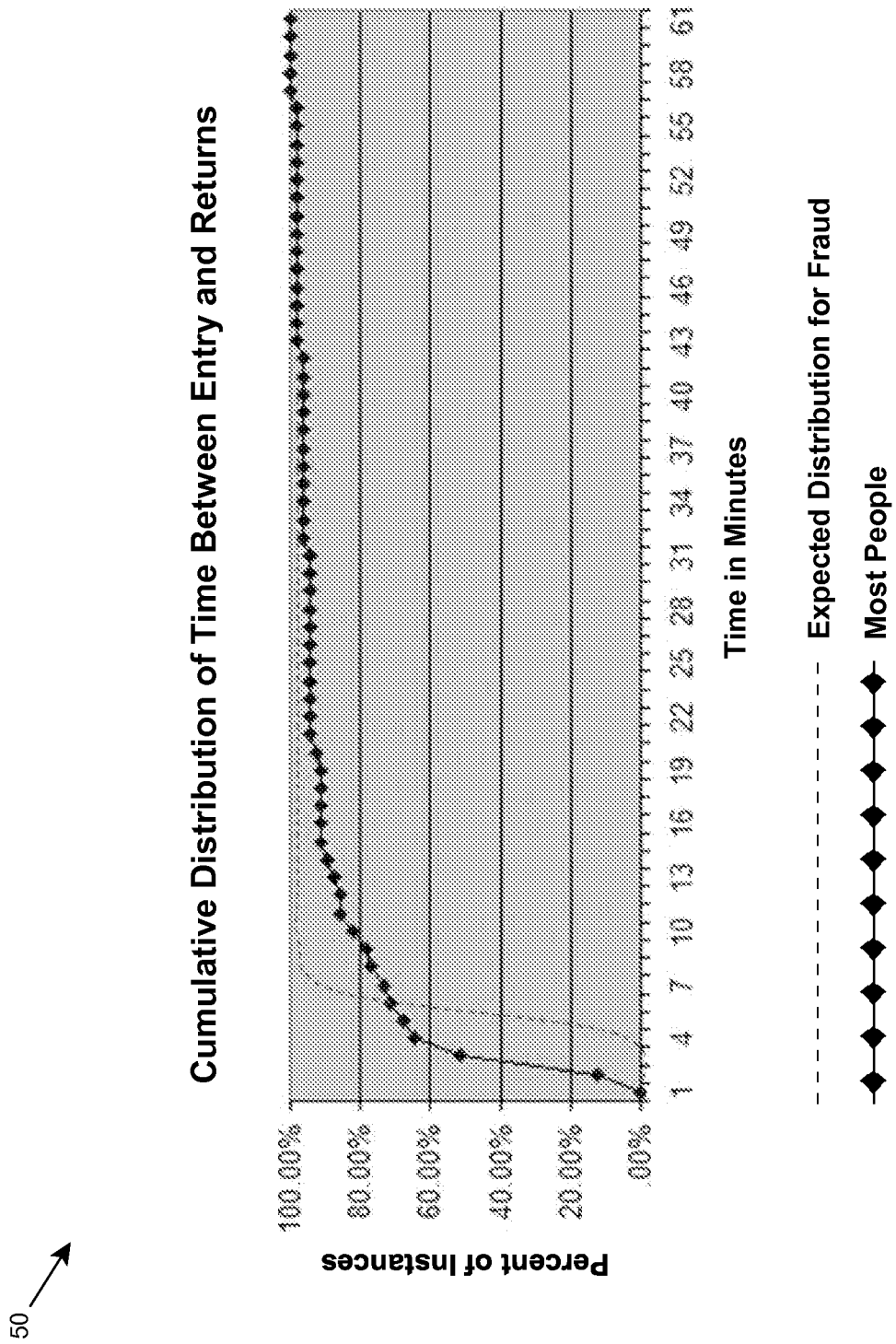
FIG. 6 shows an illustrative chart of an amount of time between entry and the merchandise return according to an embodiment.

When analyzing merchandise returns, computer system 20 can limit the surveillance data for customer entry events provided in panel 64A to a time period that immediately precedes the merchandise return. In particular, FIG. 6 shows an illustrative chart of an amount of time between entry and the merchandise return according to an embodiment. As illustrated, approximately 65% of the customers make the return within four minutes of entering the store. However, it is expected that very few fraudulent returns would be completed within four minutes of entering the store (e.g., since the individual must first go and obtain the item(s) from the store shelves). As a result, by default, computer system 20 can limit the surveillance data 40 for customer entry events to the preceding four minutes.

Figure 5B:
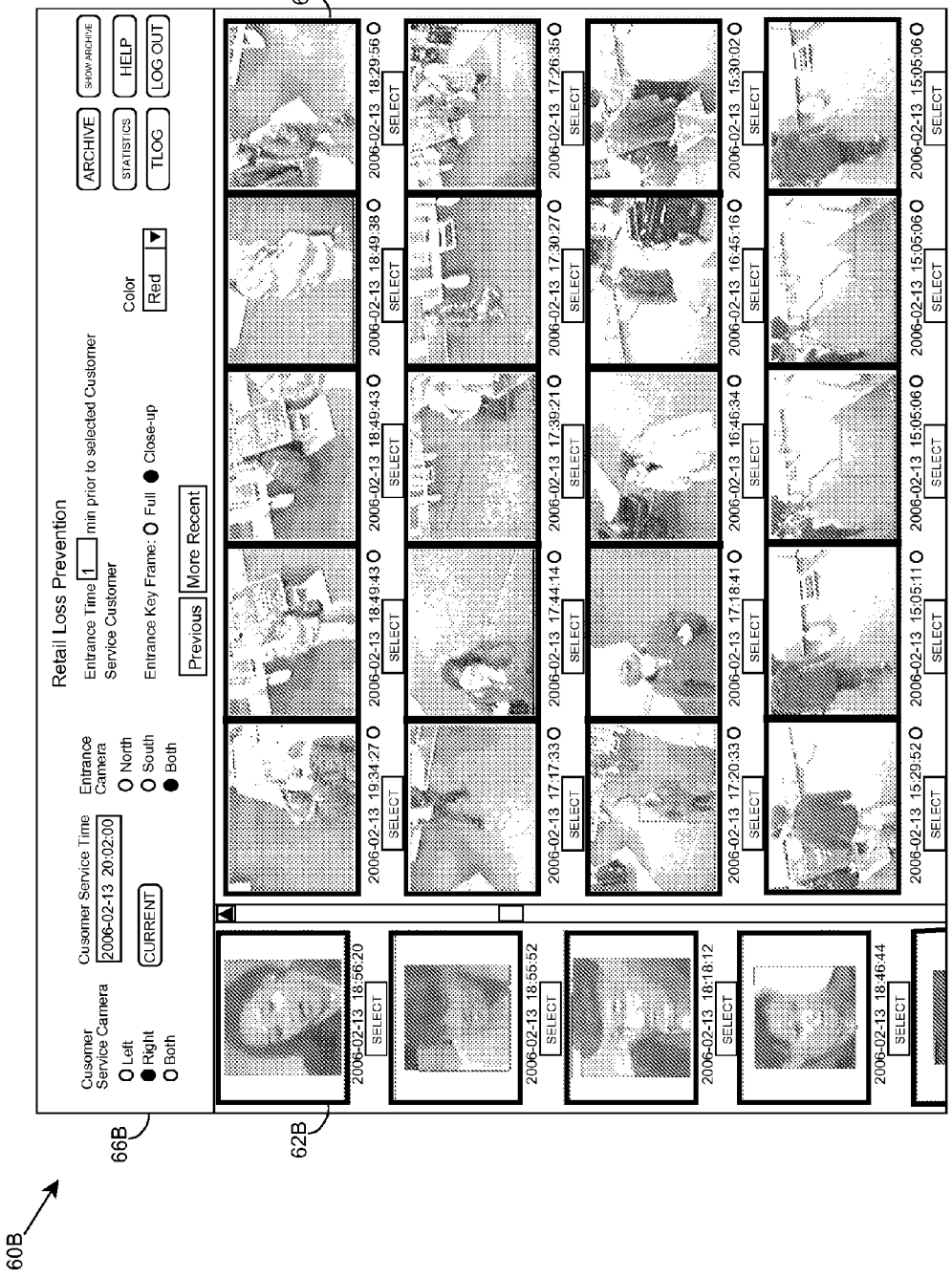

Alternatively, computer system 20 can manage a user interface 60A that is provided to a cashier/associate for use in real time evaluation of potential fraud, such as a merchandise return. To this extent, FIG. 2B shows an illustrative process that can be implemented by environment 10 according to an embodiment, and FIG. 5B shows an alternative user interface 60B for conducting people searches, which can be generated by computer system 20 and provided for presentation to user 18, according to an embodiment. Similar to user interface 60A, user interface 60B includes panels 62B, 64B for displaying surveillance data 40 for two distinct monitored events, and a panel 66B, which enables a user 18 to selectively alter the surveillance data 40 displayed in panels 62B, 64B.

In process 202, computer system 20 can provide surveillance data for an event type of interest for presentation to user 18. For example, each time computer system 20 detects a new individual approaching a customer service/returns counter, computer system 20 can update panel 62B on user interface 60B with surveillance data 40 of the individual. Subsequently, in process 204, the user 18 (e.g., a cashier at the customer service/returns counter) can select the surveillance data 40 of a particular individual for analysis, which can be received by computer system 20.

In process 206, computer system 20 can provide surveillance data 40 for related events of another event type for presentation to user 18 using a set of default relatedness criteria. For example, computer system 20 can provide surveillance data 40 for customer entry events into the retail store in panel 64B. By default, computer system 40 can limit the customer entry events for which surveillance data 40 is provided to only those that occurred within a specified number of minutes before the selected event. In process 208, computer system 20 can determine whether user 18 has selected to change any of the set of relatedness criteria. If so, then in process 210, computer system 20 can adjust/filter the events for which surveillance data 40 is presented to user 18. For example, user 18 can adjust the time frame, limit the events to a particular location in the store (e.g., a single entrance), limit the events having one or more attributes (e.g., visual features, such as color of clothing, facial recognition, and/or the like), etc.

Regardless, user 18 can direct the analysis until he/she indicates that he is done in process 212. In an embodiment, while user 18 is reviewing the surveillance data 40 in processes 206, 208, 210, user 18 can indicate whether any surveillance data 40 for the related events was found that matches/corresponds to the selected event. If so, computer system 20 can store that the two or more corresponding events are related for future reference. In any event, once user 18 has completed his/her analysis, the process can return to process 202 until user 18 selects another event.

As a result, aspects of the invention provide an improved solution for integrating multiple event analysis using surveillance data and/or transaction data to improve, for example, fraud detection in a retail store. To this extent, aspects of the invention use video/image analysis to index image data and/or transaction data, enabling ready retrieval of surveillance data 40 for events of interest using a variety of cues. In this manner, aspects of the invention provide an improved solution for performing post-event analysis (e.g., reviewing merchandise returns for fraudulent activity) and real time analysis (e.g., reviewing customer entries to ensure presented return is valid). Such analysis can enable: (1) increased use of video due to more feasible, automated searching; (2) lower search costs (computer implemented vs. manual); and (3) increased search accuracy by removing some human error and inattentiveness.

In the retail environment, fraudulent claims can be defeated/shown by video demonstration. To this extent, numerous fraudulent scenarios can be defeated, such as: (1) return of merchandise using valid receipt, but item newly retrieved from store; (2) return of item newly retrieved from store without receipt; (3) false accident claim (can determine if accident took place, identify actions inconsistent with an accident); (4) negligent behavior leading to an accident; and/or the like. While primarily shown and described within the retail environment, it is understood that aspects of the invention can be applied equally to many different environments including, for example, public transportation, public facilities, streets, and/or the like.

While shown and described herein as a method and system for presenting surveillance data for an area, it is understood that aspects of the invention further provide various alternative embodiments. For example, in one embodiment, the invention provides a computer program stored on at least one computer-readable medium, which when executed, enables a computer system to monitor an area. To this extent, the computer-readable medium includes program code, such as surveillance program 30 (FIG. 1), which implements some or all of a process described herein. It is understood that the term "computer-readable medium" comprises one or more of any type of tangible medium of expression capable of embodying a copy of the program code (e.g., a physical embodiment). For example, the computer-readable medium can comprise: one or more portable storage articles of manufacture; one or more memory/storage components of a computing device; a modulated data signal having one or more of its characteristics set and/or changed in such a manner as to encode information in the signal; paper; and/or the like.

In another embodiment, the invention provides a method of generating a system for presenting surveillance data for an area. In this case, a computer system, such as computer system 20 (FIG. 1), can be obtained (e.g., created, maintained, made available, etc.) and one or more programs/systems for performing a process described herein can be obtained (e.g., created, purchased, used, modified, etc.) and deployed to the computer system. To this extent, the deployment can comprise one or more of: (1) installing program code on a computing device from a computer-readable medium; (2) adding one or more computing devices to the computer system; and (3) incorporating and/or modifying the computer system to enable it to perform a process described herein.

It is understood that aspects of the invention can be implemented as part of a business method that performs a process described herein on a subscription, advertising, and/or fee basis. That is, a service provider could offer to monitor an area as described herein. In this case, the service provider can manage (e.g., create, maintain, support, etc.) a computer system, such as computer system 20 (FIG. 1), that performs a process described herein for one or more customers. In return, the service provider can receive payment from the customer(s) under a subscription and/or fee agreement, receive payment from the sale of advertising to one or more third parties, and/or the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A method of presenting surveillance data for an area, the method comprising:

receiving sensor data and transaction data for a retail store on a computer system including at least one computing device, the transaction data including data on at least one point of sale (POS) event;

associating at least some of the sensor data with each of the at least one POS events using the computer system;

storing the transaction data and associated sensor data as surveillance data for the POS event using the computer system;

providing primary surveillance data for a set of primary events corresponding to one of a plurality of monitored event types for display to a user in a user interface using the computer system, wherein each of the plurality of monitored event types corresponds to a human action occurring within the area;

obtaining a selected event identified by the user using the user interface from the set of primary events and a corresponding set of relatedness criteria on the computer system in response to the providing, wherein the set of relatedness criteria defines a set of attributes of surveillance data indicating an event may be related to the selected event;

identifying a set of related events corresponding to another one of the plurality of monitored event types based on the surveillance data for the selected event and the set of relatedness criteria using the computer system in response to the obtaining; and providing related surveillance data for each related event for display to the user in the user interface using the computer system in response to the identifying, wherein the user interface includes a first display area for displaying the primary surveillance data and a second display area distinct from the first display area for concurrently displaying the related surveillance data with the primary surveillance data, wherein the set of primary events include merchandise returns at the retail store and the set of related events include customer entrances to the retail store.

2. The method of claim 1, wherein the related surveillance data includes image data, the method further comprising:
obtaining a visual feature; and
filtering the related surveillance data for the set of related events based on the visual feature and the image data.

3. The method of claim 1, further comprising:
obtaining a set of related image sources; and
adjusting the related surveillance data for the set of related events to only include related surveillance data acquired by the set of related image sources.

4. The method of claim 1, wherein the surveillance data for the set of primary events only includes surveillance data acquired by a designated subset of a plurality of primary sensors.

5. The method of claim 1, further comprising:
generating a transaction user interface for displaying transaction data corresponding to the set of primary events and enabling the user to request to view image data corresponding to at least one of the set of primary events; and
providing the transaction user interface for presentation to the user.

6. A computer system comprising:
a set of computing devices for presenting surveillance data for an area by performing a method comprising:
receiving sensor data and transaction data for a retail store, the transaction data including data on at least one point of sale (POS) event;
associating at least some of the sensor data with each of the at least one POS events;
storing the transaction data and associated sensor data as surveillance data for the POS event;
providing primary surveillance data for a set of primary events corresponding to one of a plurality of monitored event types for display to a user in a user interface, wherein each of the plurality of monitored event types corresponds to a human action occurring within the area;
obtaining a selected event identified by the user using the user interface from the set of primary events and a corresponding set of relatedness criteria in response to the providing, wherein the set of relatedness criteria defines a set of attributes of surveillance data indicating an event may be related to the selected event;
identifying a set of related events corresponding to another one of the plurality of monitored event types based on the surveillance data for the selected event and the set of relatedness criteria in response to the obtaining; and
providing related surveillance data for each related event for display to the user in the user interface in response to the identifying, wherein the user interface includes a first display area for displaying the primary surveillance data and a second display area distinct from the first display area for concurrently displaying the related surveillance data with the primary surveillance data,
wherein the set of primary events include merchandise returns at the retail store and the set of related events include customer entrances to the retail store.

7. The system of claim 6, wherein the related surveillance data includes image data, the method further comprising:
obtaining a visual feature; and
filtering the related surveillance data for the set of related events based on the visual feature and the image data.

8. The system of claim 6, the method further comprising:
obtaining a set of related image sources; and
adjusting the related surveillance data for the set of related events to only include related surveillance data acquired by the set of related image sources.

9. The system of claim 6, the method further comprising:
generating a transaction user interface for displaying transaction data corresponding to the set of primary events and enabling the user to request to view image data corresponding to at least one of the set of primary events; and
providing the transaction user interface for presentation to the user.

10. A computer program comprising program code stored on a computer-readable device, which when executed, enables a computer system to implement a method of presenting surveillance data for an area, the method comprising:
receiving sensor data and transaction data for a retail store, the transaction data including data on at least one point of sale (POS) event;
associating at least some of the sensor data with each of the at least one POS events;
storing the transaction data and associated sensor data as surveillance data for the POS event;
providing primary surveillance data for a set of primary events corresponding to one of a plurality of monitored event types for display to a user in a user interface, wherein each of the plurality of monitored event types corresponds to a human action occurring within the area;
obtaining a selected event identified by the user using the user interface from the set of primary events and a corresponding set of relatedness criteria in response to the providing, wherein the set of relatedness criteria defines a set of attributes of surveillance data indicating an event may be related to the selected event;
identifying a set of related events corresponding to another one of the plurality of monitored event types based on the surveillance data for the selected event and the set of relatedness criteria in response to the obtaining; and
providing related surveillance data for each related event for display to the user in the user interface in response to the identifying, wherein the user interface includes a first display area for displaying the primary surveillance data and a second display area distinct from the first display area for concurrently displaying the related surveillance data with the primary surveillance data,
wherein the set of primary events include merchandise returns at the retail store and the set of related events include customer entrances to the retail store.

11. The computer program of claim 10, wherein the related surveillance data includes image data, the method further comprising:
obtaining a visual feature; and filtering the related surveillance data for the set of related events based on the visual feature and the image data.

12. The computer program of claim 10, the method further comprising:
obtaining a set of related image sources; and
adjusting the related surveillance data for the set of related events to only include related surveillance data acquired by the set of related image sources.

13. The computer program of claim 10, the method further comprising:
generating a transaction user interface for displaying transaction data corresponding to the set of primary events and enabling the user to request to view image data corresponding to at least one of the set of primary events; and providing the transaction user interface for presentation to the user.

14. A method of generating a system for presenting surveillance data for an area, the method comprising:
- providing a computer system including at least one computing device, wherein the computer system is operable to:
- receive sensor data and transaction data for a retail store, the transaction data including data on at least one point of sale (POS) event;
- associate at least some of the sensor data with each of the at least one POS events;
- store the transaction data and associated sensor data as surveillance data for the POS event;
- provide primary surveillance data for a set of primary events corresponding to one of a plurality of monitored event types for display to a user in a user interface, wherein each of the plurality of monitored event types corresponds to a human action occurring within the area;
- obtain a selected event identified by the user using the user interface from the set of primary events and a corresponding set of relatedness criteria in response to the providing, wherein the set of relatedness criteria defines a set of attributes of surveillance data indicating an event may be related to the selected event;
- identify a set of related events corresponding to another one of the plurality of monitored event types based on the surveillance data for the selected event and the set of relatedness criteria in response to the obtaining; and
- provide related surveillance data for each related event for display to the user in the user interface in response to the identifying, wherein the user interface includes a first display area for displaying the primary surveillance data and a second display area distinct from the first display area for concurrently displaying the related surveillance data with the primary surveillance data,
- wherein the set of primary events include merchandise returns at the retail store and the set of related events include customer entrances to the retail store.

* * * * *